United States Patent
Choi

(10) Patent No.: US 11,341,702 B2
(45) Date of Patent: May 24, 2022

(54) SYSTEMS AND METHODS FOR DATA BUNDLES IN COMPUTER ANIMATION

(71) Applicant: Weta Digital Limited, Wellington (NZ)

(72) Inventor: Byung Kuk Choi, Wellington (NZ)

(73) Assignee: UNITY TECHNOLOGIES SF, San Francisco, CA (US)

( * ) Notice: Subject to any disclaimer, the term of this patent is extended or adjusted under 35 U.S.C. 154(b) by 0 days.

(21) Appl. No.: 17/082,859

(22) Filed: Oct. 28, 2020

(65) Prior Publication Data

US 2022/0076471 A1 Mar. 10, 2022

Related U.S. Application Data

(60) Provisional application No. 63/076,856, filed on Sep. 10, 2020, provisional application No. 63/076,858, filed on Sep. 10, 2020.

(51) Int. Cl.
| | |
|---|---|
| *G06T 13/00* | (2011.01) |
| *G06T 13/40* | (2011.01) |
| *G06T 15/00* | (2011.01) |
| *G06V 40/16* | (2022.01) |
| *G06N 3/08* | (2006.01) |
| *G06T 17/20* | (2006.01) |

(52) U.S. Cl.
CPC ............ *G06T 13/40* (2013.01); *G06T 15/005* (2013.01); *G06V 40/16* (2022.01); *G06N 3/084* (2013.01); *G06T 17/20* (2013.01)

(58) Field of Classification Search
CPC ......... G06T 13/40; G06T 13/00; G06T 13/80; G06T 13/20; A63F 13/10

USPC ......................................................... 345/473
See application file for complete search history.

(56) References Cited

U.S. PATENT DOCUMENTS

| | | | |
|---|---|---|---|
| 10,497,163 B1 | 12/2019 | Sachania et al. | |
| 2007/0035541 A1* | 2/2007 | Isner | ...................... G06T 13/40 345/420 |
| 2008/0024505 A1 | 1/2008 | Gordon et al. | |
| 2011/0175921 A1 | 7/2011 | Havaldar et al. | |
| 2015/0213307 A1* | 7/2015 | Beeler | ..................... G06T 13/40 382/190 |

OTHER PUBLICATIONS

Bao et al., "High-Quality Face Capture Using Anatomical Muscles", 2019 IEEE/CVF Conference on Computer Vision and Pattern Recognition (CVPR), IEEE, Jun. 15, 2019, pp. 10794-10803.
Cong et al., "Art-Directed Muscle Simulation for High-End Facial Animation", In Proceedings of the ACM SIGGRAPH/Eurographics Symposium on Computer Animation, Jul. 11, 2016, 9 pages.

(Continued)

*Primary Examiner* — Gordon G Liu
(74) *Attorney, Agent, or Firm* — Philip H. Albert; Jiaping Liu; Haynes and Boone LLP

(57) ABSTRACT

An animation system wherein a machine learning model is adopted to learn a transformation relationship between facial muscle movements and skin surface movements. For example, for the skin surface representing "smile," the transformation model derives movement vectors relating to what facial muscles are activated, what are the muscle strains, what is the joint movement, and/or the like. Such derived movement vectors may be used to simulate the skin surface "smile."

20 Claims, 8 Drawing Sheets

(56) References Cited

OTHER PUBLICATIONS

Ichim et al., "Phace: Physics-based Face Modeling and Animation", ACM Transactions on Graphics, vol. 36, No. 4, Article 153, Jul. 20, 2017, 14 pages.
Sifakis et al., "Automatic Determination of Facial Muscle Activations from Sparse Motion Capture Marker Data", Association for Computing Machinery, Inc., 2005, pp. 417-425.
Song et al., "Accurate Face Rig Approximation with Deep Differential Subspace Reconstruction", arXiv preprint arXiv:2006.01746v2, Aug. 18, 2020, 12 pages.
Xu et al., "RigNet: Neural Rigging for Articulated Characters", ACM Trans Graph., vol. 39, No. 4, Article 58, Jul. 2020, 14 pages.
International Search Report and Written Opinion for International App. No. PCT/NZ2020/050147 dated Jun. 2, 2021.
International Search Report and Written Opinion for International App. No. PCT/NZ2020/050148 dated Jun. 4, 2021.
International Search Report and Written Opinion for International App. No. PCT/NZ2020/050149 dated Jun. 4, 2021.

\* cited by examiner

SYSTEMS AND METHODS FOR DATA BUNDLES IN COMPUTER ANIMATION

PRIORITY CLAIMS

The present application is a nonprovisional of and claims priority under 35 U.S.C. 119 to U.S. Provisional Applications 63/076,856 and 63/076,858, both of which are hereby expressly incorporated by reference herein in their entirety.

The present application is related to co-pending and commonly-owned U.S. application Ser. No. 17/082,890 and 17/082,895, filed on the same date, which is hereby expressly incorporated by reference herein in its entirety.

FIELD OF THE INVENTION

The present disclosure generally relates to tools for generating computer-generated imagery. The disclosure relates more particularly to apparatus and techniques for building a machine learning model that learns muscle-to-skin transformations for creating computer-generated imagery of a character.

BACKGROUND

Many industries generate or use computer-generated imagery, such as images or video sequences. The computer-generated imagery might include computer-animated characters that are based on live actors. For example, a feature film creator might want to generate a computer-animated character having facial actions, movements, behaviors, etc. that is the same or substantially similar to a live actor, human or otherwise. Existing animation systems may recreate, in detail, a skin surface of the computer-animated character that closely resembles a live actor. Simulating the movements and/or facial action of the computer-animated character that may appear to be similar to the live actor remains challenging, as a large number of variables can be involved in the simulation process. For example, there are more than 40 muscles controlled by seven nerves in a human face, and a facial action can be decomposed into different combinations of changes in the movements of the muscles.

Some existing animation systems largely rely on capturing facial scans of a live actor and volume of facial scans to be processed can often be tremendous to experiment to obtain different facial actions, which is often a tedious and sometimes impractical operation.

SUMMARY

In an embodiment, a computer-implemented method or apparatus provides for computer-implemented method for processing data derived from scans of live actors. The method includes obtaining scan data corresponding to a performance of a live actor performing a facial movement over a data bundle time period, deriving a data bundle from the scan data, wherein the data bundle comprises control values for a muscle model of the live actor for application to the muscle model and rendering as an animation, to approximate the performance, the data bundle comprising a first cache of data representing movement of a skin surface over the data bundle time period and a second cache of data representing changes to muscle strains in a muscle strain vector over the data bundle time period. The method further includes obtaining an artist movement adjustment for the skin surface relative to movement corresponding to the data bundle, and generating a modified data bundle having a modified second cache, wherein the modified second cache, when applied to the muscle model, causes the muscle model to move in variance with the data bundle to approximate a modified first cache represented by the first cache adjusted according to the artist movement adjustment.

In one implementation, the performance begins at a neutral pose and ends at the neutral pose.

In one implementation, the data bundle comprises the first cache, the second cache, a third cache of data representing jaw movements over the data bundle time period, and a fourth cache of data representing eye movements over the data bundle time period.

In one implementation, the method further comprises determining an action locus for the artist movement adjustment, determining a range of action for the artist movement adjustment, determining a subset of the muscle strain vector applicable to the range of action, and limiting changes of the modified first cache relative to the first cache to changes in the subset of the muscle strain vector.

In one implementation, the method further comprises limiting a search for values for the second cache to a manifold of allowed values for the second cache of data.

In one implementation, the manifold of allowed values for the second cache of data correspond to known feasible expressions of the live actor.

In one implementation, the facial movement is one or more of a facial action, a dialog, and/or a depiction of an emotion.

BRIEF DESCRIPTION OF THE DRAWINGS

Various embodiments in accordance with the present disclosure will be described with reference to the drawings, in which.

DETAILED DESCRIPTION

Figure 1:
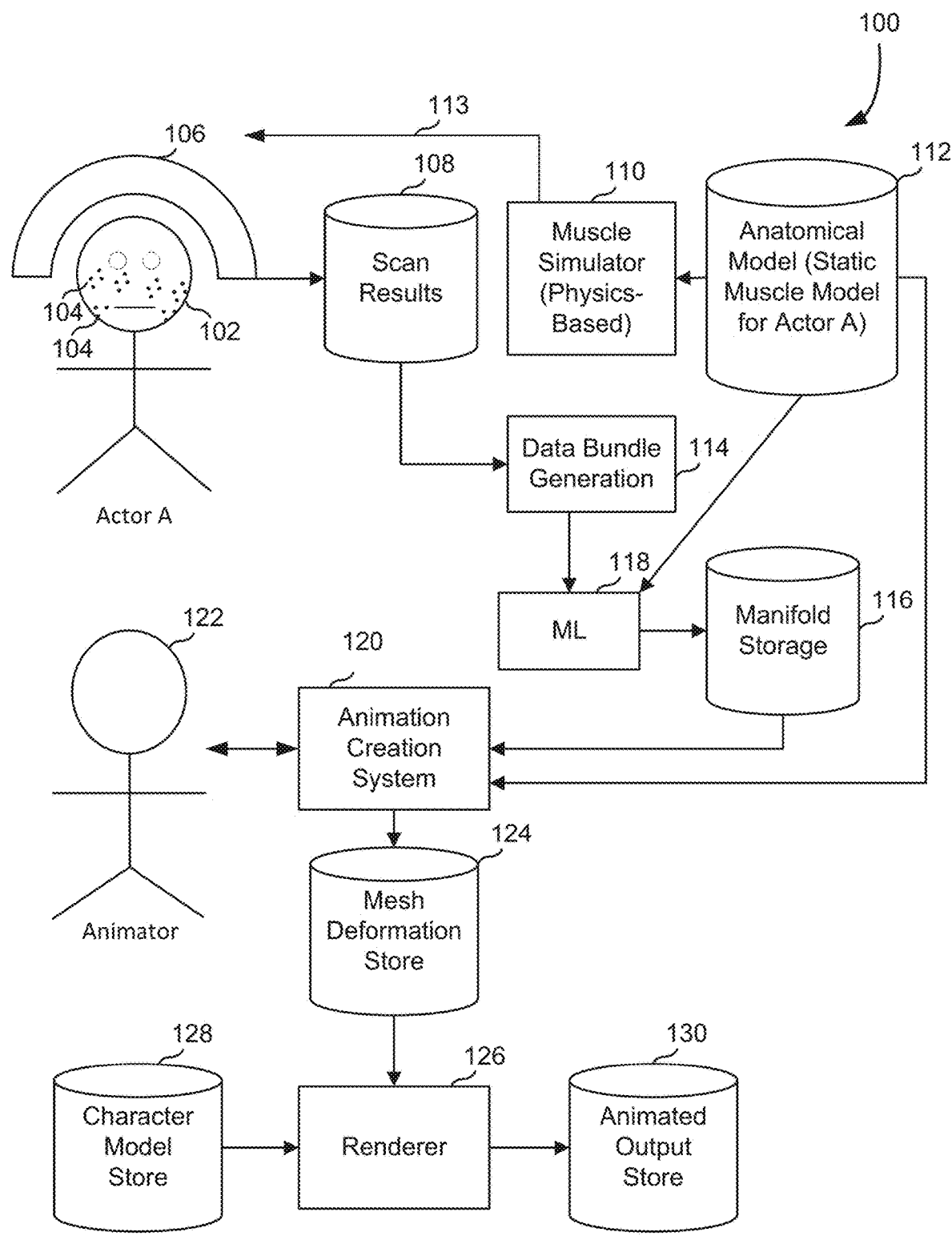
FIG. 1 illustrates an animation pipeline that might be used to render animated content showing animation of a character based on a machine learning model that is trained from scans of a live actor.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Video applications nowadays may adopt computer-animated technology to create simulated characters, human or non-human, to appear a video. For example, the film industry has been using computer animation to generate characters that is often physically difficult or even impossible to be played by human actors. The physical appearance of such computer-animated characters may be designed and controlled by an animator, via configuring time-varying parameters to simulate the muscle, joint and bone structures and movements of a living creature, human or non-human. In this way, the computer-animated character may be created to emulate the persona of a real living creature.

As used herein, an animator may refer to a human artist, filmmaker, photography image creator, or the like, who seeks to generate one or more images (such as a video sequence forming an animation) based on animator input and other data available to the animator. In some embodiments, the animator might be an automated or partially automated process. Animator inputs might include specifications of values for positions of movable elements. For example, an articulated character's movement might be specified by values of each available joint in the character.

As used herein, a rig may refer to a representation of data that corresponds to elements of a character, the allowed movements, etc. One such rig is a facial rig. An animator might be provided with a user interface of an animation creation system that allows the animator to input values for various movable elements of the facial rig. Some movable elements might be a jaw and a collection of muscles. From a specification of provided variables of the movable elements of the facial rig, the animation creation system can generate a pose of the facial rig. For example, when variables corresponding to an amount of contraction for the muscles on either side of the mouth are set to values that represent maximum contraction of those muscles, the animation creation system would output a pose with a face having a widened mouth. By varying the variables from frame to frame, and thus changing poses from frame to frame, animation creation system can output positions of elements, thicknesses of elements, etc., which might be provided as input to a rendering system.

A state of a facial rig corresponding to a particular expression, movement, or placement of elements of the facial rig so as to convey an expression or positioning of facial elements might be represented in computer memory as a data structure such as a strain vector. A strain vector might have components representing jaw position, eye positions, and strain values for each muscle in the facial rig that can be specified by the strain vector. For example, a strain of a muscle may have a value of 0.0 in its natural pose, e.g., when the muscle is in a neutral state. When the muscle is moving along the time, the strain value may change approximately from −1.0 to 1.0 representing a state of compression or elongation of the muscle. Thus, a particular expression of a live actor can be represented by a strain vector and that strain vector can be used to move or position elements of a facial rig—of that live actor, of a fanciful character, etc.—for generating computer-generated imagery. In some embodiments, the strain value components are one per muscle each having a value representing a present strain value for its corresponding muscle. A strain value might have a fixed value for a muscle in a neutral position for that muscle and a range of values covering contractions relative to the neutral position relaxations relative to the neutral position. In a very specific embodiment, a neutral position value for a strain is zero, a strain value for a muscle contracted relative to the neutral position is a negative number, and a strain value for a muscle relaxed relative to the neutral position is a positive number. The strain value in that specific embodiment might correspond to a length assigned to the muscle in the corresponding position.

Given that a facial rig might comprise a large number of muscles, manually and individually setting each muscle's strain value in the strain vector can be a tedious process and it can be hard to manually match the strain vector component values to a desired state or expression.

As used herein, a facial action or a facial pose refers to a particular state of facial muscles at a time instance when each facial muscle corresponds to a particular strain value. For example, each facial scan of a live actor at a particular time instance may capture an individual facial action or facial pose. A neutral pose refers to a state when each facial muscle is at a rest state without engaging a strain.

A facial expression is considered to encompass a plurality of facial actions or facial pose. For example, the facial expression "grin" may include a plurality of consecutive facial actions spanning a period of time. The consecutive facial actions may correspond to a series of facial muscle movements with the lips going from neutral to an upward position.

In one embodiment, an animator can generate animation of a face of a character making an expression, perhaps talking according to certain speech, and moving around by inputting, or otherwise specifying or determining, a set of strains, wherein a strain is a metric of a muscle that can be moved. In an example, a strain of a muscle is represented as a numerical value where 0.0 corresponds to the muscle in a rest or default position, a positive number corresponds to muscle contraction and a negative number corresponds to muscle relaxation. For example, the numerical value for a strain, S, of a muscle, M, might be as expressed in Equation 1.

$$S_M = (\text{rest\_length}_M - \text{length}_M) / \text{rest\_length}_M \qquad \text{(Eqn. 1)}.$$

One difficulty with animating a face is that there are a large number of facial muscles and specifying a strain for each can be tedious, especially where many scenes need to be created. Existing animation systems typically generate a large number of facial scans of a live actor making a specific facial expression and analyze each scan to obtain the animation parameters for the specific facial expression. For example, each facial action in the specific may correspond to parameters indicating where the muscles are attached, which are activated, where both ends are attached, the respective muscle thicknesses, the strains for the respective activated muscles, the respective joints that are activated, and/or the like. Then the obtained animation parameters may be used by the animator to simulate a facial expression, e.g., on the computer-animated character. This process can often be tedious and time-consuming, as each simulated facial expression entails capturing a large number of facial scans from the live actor making the same facial expression and subsequent data analysis of the large number of facial scans.

In view of a need for an efficient computer-animation mechanism to emulate facial expression for computer-animated characters, embodiments described herein provide a machine learning based mechanism that derives a transformation between facial muscles and anatomical data of an actor, and corresponding skin surfaces. For example, for the skin surface representing "smile," the transformation model derives movement vectors relating to what facial muscles are activated, what are the muscle strains, what is the joint movement, and/or the like. Such derived movement vectors may be used to simulate the skin surface "smile."

The machine learning model is trained by training datasets, e.g., in the form of data bundles, created from a large number of facial scans of a live actor. As used herein, a data instance may refer to data relating to an incident that occurs at a specific timestamp. For example, a data instance may be a facial scan of a live actor captured at a specific timestamp, a muscle strain parameter corresponding to muscle status at a specific timestamp, a skin surface representation vector corresponding to a facial action that occurs at a specific timestamp, and/or the like. As used herein, a data bundle may refer to a collection of data instances that are stored in a cache over a time period, a data bundle time period. For example, the collection of data instances may record a time-varying value of the instance over the data bundle time period.

For example, each data bundle captures a cache of facial muscle movement over a data bundle time period, a cache of skin surface movement over the data bundle time period, and anatomical data corresponding to the live actor. The machine learning model may thus be trained using the cache of facial muscle movement over a data bundle time period as an input, and the cache of skin surface movement over the data bundle time period as ground truth labels.

FIG. 1 illustrates an animation pipeline 100 that might be used to render animated content showing animation of a character based on a machine learning model that is trained from scans of a live actor. As illustrated there, a live actor 102 ("Actor A") might be outfitted with fiducials 104 and have their face, expressions and/or body scanned by a scanner 106. The scanner 106 would then output or store results of scanning to a scan results store 108. The fiducials 104 allow for the scan data that results from scanning to include indications of how specific points on the surface of the face of the live actor 102 move given particular actions. In one embodiment, the fiducials 104 may be optional, and other capture hardware and optical flow software may be adopted to track the skin surface, resulting in high-resolution skin texture capture and pore-level tracking.

If the scanner 106 captures data in three dimensions ("3D"), the scan data could also indicate the surface manifold in 3D space that corresponds to the surface of the live actor's face. As used herein, manifold is used to refer to the time-varying topology of facial surface that corresponds to a certain facial expression that comprises a plurality of facial actions, e.g., "smile," "grin," "sobbing," and/or the like.

While it might be expected that the skull of the live actor 102 is a constant shape and changes only by translations and rotations (and jaw movement), it is not expected that the surface manifold would be constant, a jaw movement, air pressure in the mouth, muscle movements, and other movable parts move and interact. Instead, different movements and facial actions result in different thicknesses, wrinkles, etc. of the actor's face.

Figure 3:
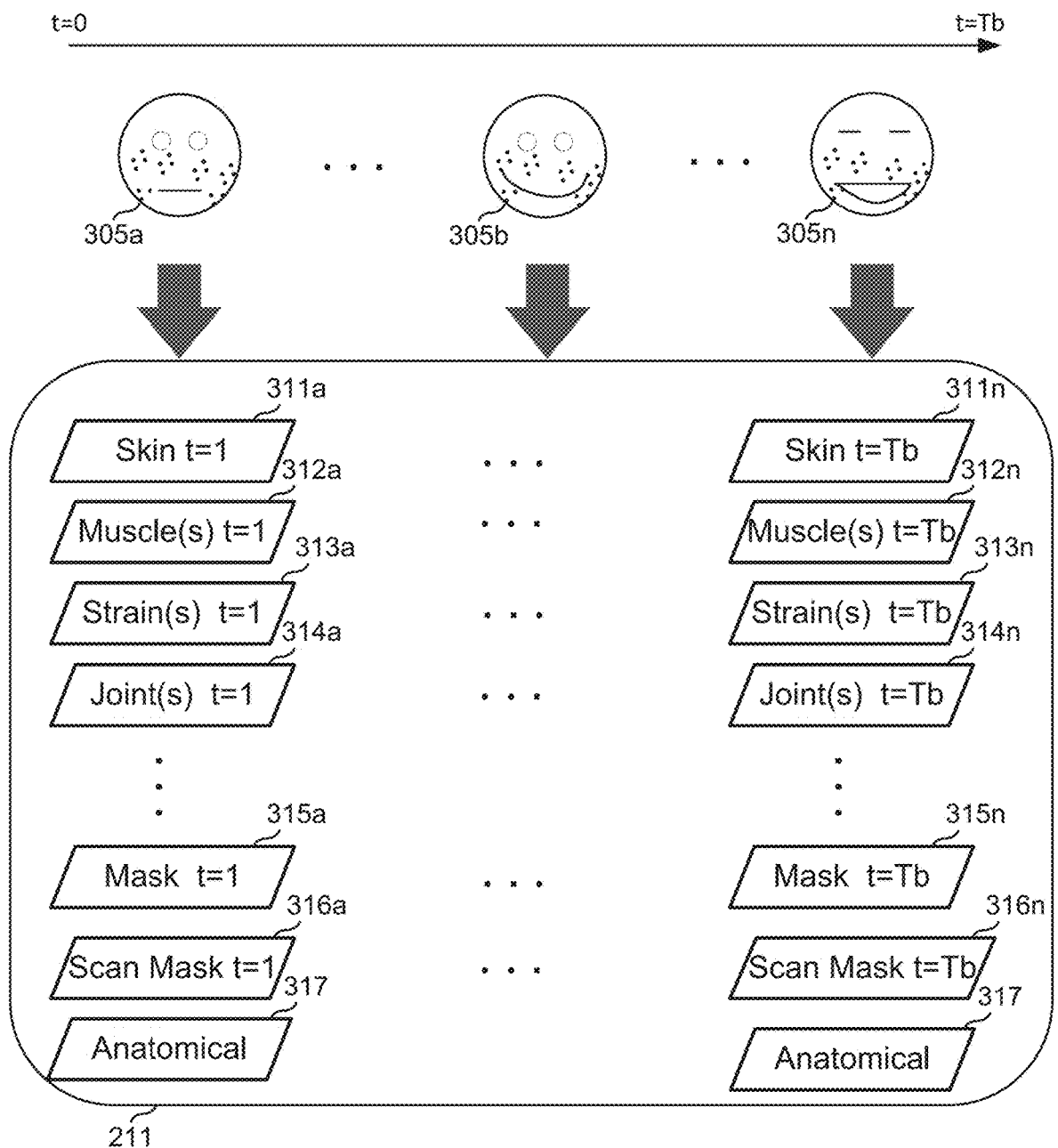
FIG. 3 provides a block diagram illustrating an example process of data bundle generation from the scan results, according to embodiments escribed herein.

The output from the scanner 106 may be stored as scan results 108, which may include a skin surface representation, muscle parameters, joint parameters, strain parameters, and/or the like. The scan results 108 are provided to a data bundle generation 114 to generate one or more data bundles of scan results over a data bundle time period T. For example, each data bundle records a respective time-varying vector representing changes of the skin surface, muscle parameters, joint parameters, strain parameters, and/or the like over the data bundle time period T. Further example data structure of the data bundle is illustrated in FIG. 3.

It might be assumed that each human actor has more or less the same facial muscles. An anatomical model dataset 112 might be provided that represents muscles, where they connect, what other typical facial elements are present (eyes, eyelids, nose, lips, philtrum, etc.) and other features likely common to most human faces. Of course, not all human faces are identical, and the actual positions of muscles, their thicknesses, where they connect to, how much they can relax and contract, are details that can vary from person to person, as well as the shape of their skull. It is typically not practical to directly determine these details from a specific live actor, as that might require invasive procedures or complex computerized axial tomography (CAT) or Magnetic resonance imaging (MRI) scans. The anatomical model 112 can represent a muscle model for Actor A.

In one embodiment, this anatomical model 112 can be provided to a muscle simulator 110 that performs physics-based muscle simulation and provides a dynamic muscle activations dataset 113 for Actor A.

In one embodiment, data representing the anatomical model 112, together with the data bundles generated by the data bundle generation module 114, may be input to the machine learning model 118. For example, the machine learning model 118 may comprise a Deep Neural Network (DNN) with a plurality of parameters.

Based on parameters in the data bundles such as parameters of the muscles, strains, joints, and/or the like, and skull parameters from the anatomical model 112, the machine learning model 118 generates a predicted skin surface representation (e.g., the visible facial action such as "smile," "frown," etc.). In this way, the machine learning model 118 can learn a muscle-to-skin transformation between parameters of the muscles, strains, joints, and/or the like and the skin surface representation of actor A through a training dataset in the form of data bundles representing scan results 108 from the actor A. Thus, based on the muscle-to-skin transformation, the machine learning model 118 can generate a new skin surface representation by adjusting the muscle, joint and strain parameters.

Alternatively, based on the skin surface representation in the data bundles, the machine learning model 118 may reversely derive the parameters of the muscles, strains, joints, and/or the like that support the skin surface representation. In this way, the machine learning model 118 can learn a skin-to-muscle transformation between the skin surface representation of actor A and parameters of the muscles, strains, joints, and/or the like through a training dataset in the form of data bundles representing scan results 108 from the actor A. Thus, based on the skin-to-muscle transformation, the machine learning model 118 can determine reversely derives the muscle, joint and strain parameters for a target skin surface representation. Further details of the machine learning model 118 may be described in relation to FIGS. 2A-2B.

In one implementation, the machine learning model 118 may be trained to infer the shape of the live actor's skull, volume of muscles, range of motion, etc., to build a manifold of possible movements for the actor. The machine learning model 118 might output a manifold to be stored in manifold storage 116. The manifold might represent the range of plausible facial actions. Logically, the manifold might represent a set of solutions or constraints in a high-dimension space corresponding to a strain vector. For example, the machine learning model 118 may be implemented through an autoencoder (AE) architecture, and is first trained with strain vectors to learn the facial manifold in the strain space.

In one implementation, the machine learning model 118 may be trained to determine an action locus for the movement or action adjustment (e.g., from "smile" to "grin") and a range of action (e.g., widened month, showing of teeth, changed upward angle of the mouth, etc.) made by the actor A, based on the data bundles from the data bundle generation 114. The machine learning model 118 may then determine a subset of the muscle strain vector applicable to the range of action, e.g., which muscles are used, and what are the corresponding strains. The machine learning model 118 may determine the manifold that limits changes to the data bundle to changes in the subset of the muscle strain vector. For example, for the movement or action adjustment (e.g., from "smile" to "grin"), the manifold model 116 may limit the changes to the strain vectors in the data bundle to a subset of muscle strain vectors relating to muscles that widen the month and show teeth, and the corresponding strains that change the upward angle of the mouth.

Correspondingly, the manifold model 116 also limits the search of updated vector values for muscle vectors or strain vectors to a manifold of allowed values for an updated cache of data vectors when the movement or expression adjustment (e.g., from "smile" to "grin") takes place. The manifold model 116 of allowed values correspond to known feasible facial actions of the live actor.

Using an animation creation system 120, an animator 112 could generate meshes that correspond to facial actions of the live actor for whom the muscle model was derived. A mesh might be stored in a mesh deformation store 124. If mesh corresponded to the facial surface of Actor A, the animation creation system 120 could be used by the animator 122 to generate a facial surface of a facial action that was not specifically made by Actor A, but would be near what it would be if Actor A had tried that facial action. The animation creation system 120 might constrain an animator's inputs by projecting them onto the manifold, which would have an effect of transforming animator inputs that are not corresponding to a plausible facial action into a strain vector that does correspond to a plausible facial action. The animator's inputs might be represented in memory as a strain vector, having components corresponding to some facial muscles, as well as other animation variables that might not be related to muscles or that are more easily represented directly, such as jaw movement, eye movement, and the like. A strain vector might be represented by an array of values, wherein a value in the array corresponds to a vector component that is a value of strain in a particular dimension, representing strain on one muscle perhaps.

A renderer 126 can process the facial surface, perhaps mapping it to a character model from a character model store 128, such as a non-human character played by Actor A, to form animated output that might be stored in animated output store 130.

Figure 2A:
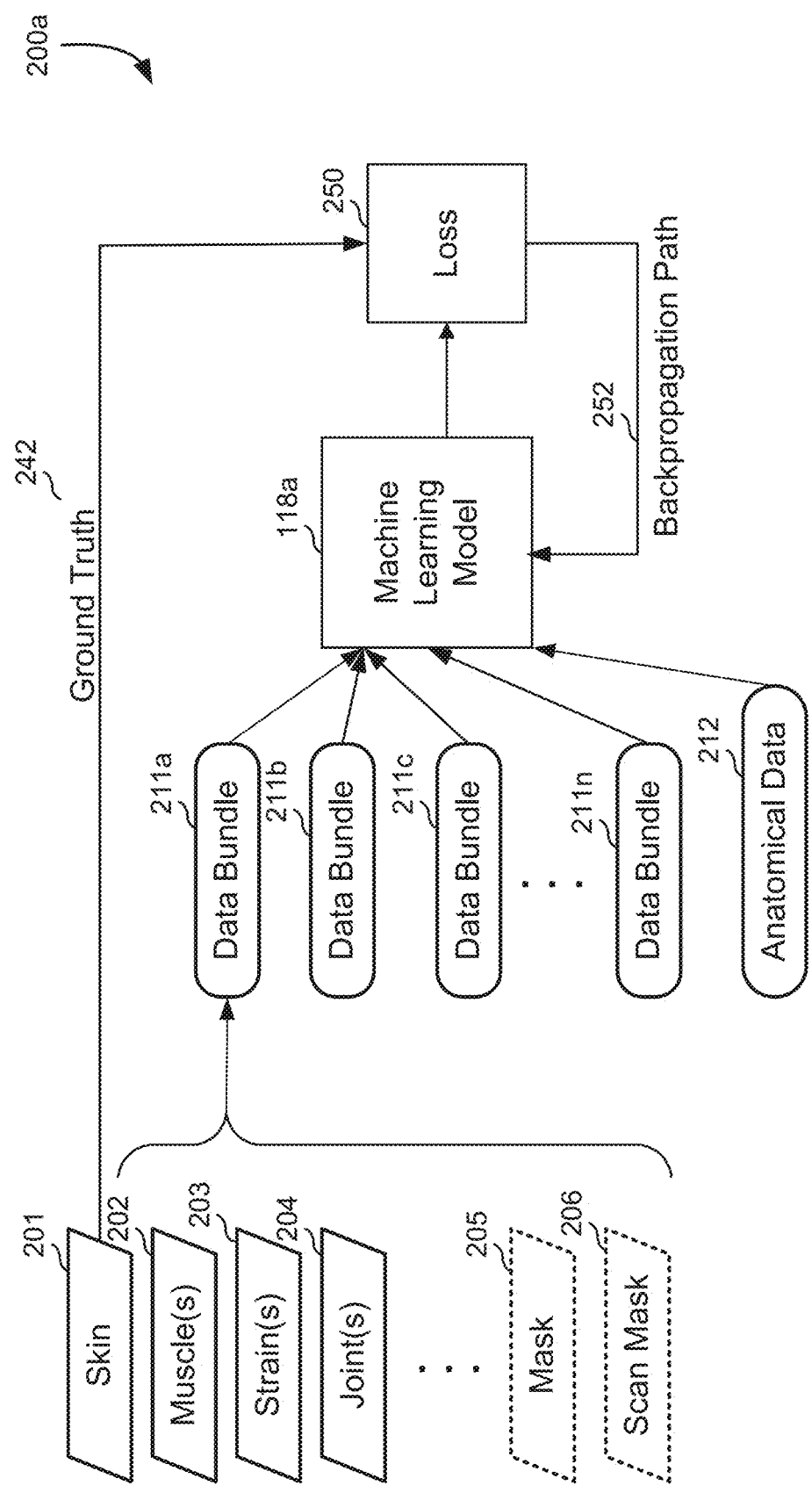
FIGS. 2A-2B illustrate an example neural system in which a machine learning model as shown in FIG. 1 is used to learn a transformational relationship between parameters of muscles, joints and/or other structures or parameters, and the skin surface expression of a facial action, according to one embodiment described herein.

FIG. 2A illustrates an example neural system 200a in which a machine learning model 118 as shown in FIG. 1 is used to learn a muscle-to-skin transformational relationship between parameters of muscles, joints and/or other structures or parameters, and the resulting skin surface of a facial action, according to one embodiment described herein. The neural system 200 includes a machine learning model 118a (which may be similar to, a part of, or one application of the machine learning model 118 shown in FIG. 1), which may receive data bundles 211a-n as inputs. For example, the data bundles 211a-n may be created by the data bundle generation module 114 described in relation to FIG. 1. Each data bundle 211a-n includes time-varying vectors representing the evolution of skin surface representation 201, muscle(s) parameter 202, strain(s) parameter 203, join(s) parameter 204, (optional) mask parameter 205, (optional) scan mask parameter 206, and/or the like, over a data bundle time period. For example, the skin surface representation 201 in a data bundle 211a, may take a form of a sequence of skin vectors S={$S_1, S_2, \ldots S_{Tb}$}, where $T_b$ denotes the length of a data bundle time period. The muscle vector 202, strain vector 203, joints vector 204, (optional) mask vector 205 and the (optional) scan mask vector 206 may take a similar form as the skin vectors described above, as a sequence of vectors over the data bundle time period $T_b$.

In one embodiment, the machine learning model 118 may be trained with datasets of data bundles 211a-n, together with anatomical data 212 corresponding to a specific human actor. For example, the anatomical data 112 may include a muscle model, which describes where the muscles are attached and their volume, and a skull model representing an actor's skull shape and contour, and/or a control vector for other non-muscle animation variables. In one implementation, the anatomical data 212 may be retrieved from the anatomical model store 112 described in FIG. 1 and may be static data for a specific human actor.

The machine learning model 118a may include an encoder that encodes the muscle vectors 202, strain vectors 203, joint vectors 204, (optional) mask vectors 205, (optional) scan mask vectors 206, anatomical data 212, and/or the like into input representations. The machine learning model 118 may also include a decoder that generates a predicted skin surface representation from the encoded input representations of the muscle vectors 202, strain vectors 203, joint vectors 204, mask vectors 205, scan mask vectors 206.

In another implementation, a linear regression model may be used to learn the relationship from the muscle/joint/strain vector to the final skin. This model can be optimized by solving a constrained least-square problem. That is, L2 loss is used between the reconstructed skin and the ground-truth skin 242. The linear regression model can also be viewed as a fully-connected layer in deep learning.

The predicted skin surface representation is then compared with the skin surface vectors 201 contained in the data bundles 201a-n, which are served as the ground truth 242. Thus, the loss module 250 may compute a training loss, e.g., the cross-entropy loss between the predicted skin surface representation from the machine learning model 118a and the ground truth labels 242 from the skin surface vectors 201 in the training data bundles 211a-n. The computed loss may in turn be used to update parameters of the machine learning model 118a for establishing the muscle-to-skin relationship, e.g., via the backpropagation path 252.

In this way, the machine learning model 118a is configured to establish a muscle-to-skin transformation between the muscle vectors, joint vectors, strain vectors, mask vectors, scan mask vectors and the anatomical data and the skin surface vector. The machine learning model 118a may then be used to generate a manifold model, which predicts a resulting skin surface representation based on an input of muscle vectors, joint vectors, strain vectors, mask vectors, scan mask vectors of a groups of points on a skull manifold.

Figure 2B:
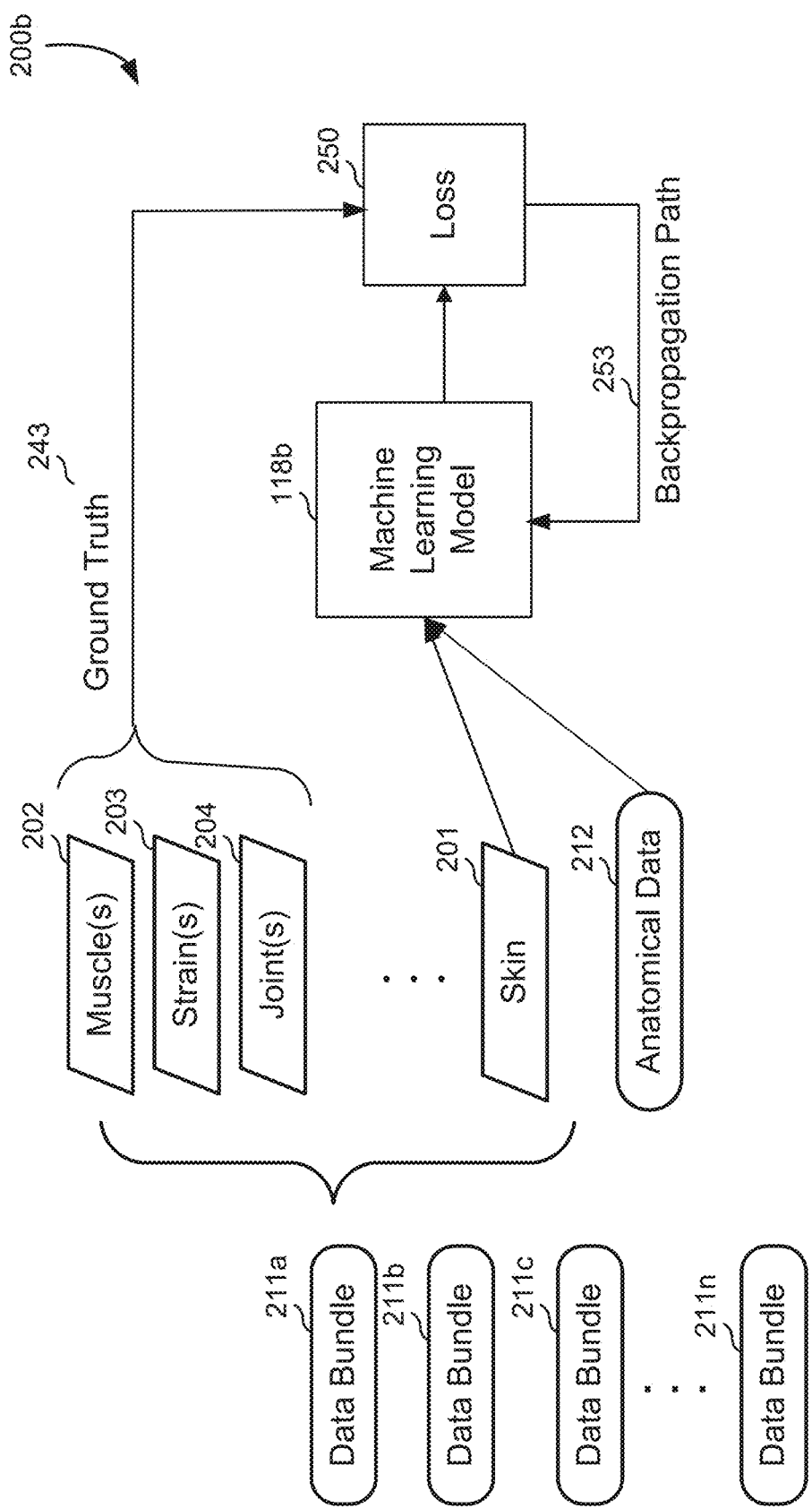

On the other hand, the machine learning model 118 may be used to derive the corresponding muscle vectors, joint vectors, strain vectors, mask vectors, scan mask vectors that may yield a specific skin surface representation. FIG. 2B illustrates an example neural system 200b in which the machine learning model 118 as shown in FIG. 1 is used to learn a skin-to-machine transformational relationship between a skin surface representation of a facial action and parameters of muscles and/or joints, according to one embodiment described herein. For example, machine learning model 118b may be considered as a reverse of the machine learning model 118a, which learns the transformative relationship from the skin surface representation to the underlying muscle and joint vectors.

The data bundles 211a-n and anatomical data 212 may be input to the machine learning model 118b, similar to the input of machine learning model 118a. Machine learning model 118b receives an input of a plurality of data bundles 211a-n. Each data bundle 211a-n includes time-varying vectors representing the evolution of skin surface representation 201, muscle(s) parameter 202, strain(s) parameter 203, joint(s) parameter 204, mask parameter 205, scan mask parameter 206, and/or the like, over a data bundle time period.

The machine learning model 118b may encode the skin parameters 201 from each data bundle, together with the anatomical data 212, and generate a prediction of the underlying muscle/joint/strain parameters that leads to the skin surface parameter 201. One or more of the muscle(s) parameter 202, strain(s) parameter 203, joint(s) parameter 204 can serve as the ground truth label 243 to the loss module 250. The loss module 250 may then compute a cross-entropy loss between the ground truth label 243 and the predicted muscle/joint/strain parameters from the machine learning model 118b. The loss may be used to update the machine learning model 118b, e.g., via the backpropagation path 253.

In one embodiment, the machine learning model 118b may be implemented through an autoencoder (AE) architecture, and is first trained with strain vectors to learn the facial manifold in the strain space. For example, the AE may comprise six hidden layers, with example dimensions of 178, 159, 124, 89, 124, 159, 178 (output layer).

In one embodiment, the loss module 250 may compute an L1 loss between the ground-truth strain vectors and the reconstructed strain vectors at the output of the machine learning module 118b.

In another example, the loss module 250 may employ Kullback-Leibler (KL) distance between the ground-truth strain vectors and the reconstructed strain vectors as the loss. For example, KL-loss may be used in the middle layer for the variational autoencoder (VAE) model.

Thus, the machine learning model 118b may be trained to learn the transformative relationship between a skin representation and the underlying muscle/joint/strain parameters. The learned transformative relationship can thus be used to derive muscle/joint/strain parameters given a target skin surface representation, and the derived muscle vectors, joint vectors, strain vectors, may then be used by an animator to create new skin surface representations, e.g., new facial actions.

In some implementations, a combination of the machine learning models 118a and 118b (collectively known as 118) may be trained end to end given the strain and skin vectors from the data bundle 201a-n. For example, the machine learning model 118b may first learn the skin deformation (skin-to-muscle) relationship with a first objective (e.g., the L2 loss), and the output predicted skin from machine learning model 118b may be input to the machine learning model 118a for reconstructing the muscle strain vector. The reconstructed muscle strain vector may then be compared with ground truth strains to compute a second loss objective (e.g., L2, KL-distance) such that the machine learning model 118a-b can be jointly trained based on a weighted sum of the first loss objective and the second loss objective.

In another implementation, the machine learning model 118a may first learn the muscle-to-skin relationship, and then output the predicted skin as the input to the machine learning model 118b. The machine learning model 118a and the machine learning model 118b can be jointly trained in a similar manner as described above.

FIG. 3 provides a block diagram illustrating an example process of data bundle generation from the scan results, according to embodiments escribed herein. As described in relation to FIGS. 1-2, the scan results of facial actions of a human actor are packaged into the form of data bundles, as an input to the machine learning model. For a data bundle period time Tb, facial scans 305a-n may be captured and stored in a cache throughout the time instances during [0, Tb]. Each facial scan (e.g., any of 305a-n) may include a skin surface representation (e.g., any of 311a-n), a muscle vector (e.g., any of 312a-n), a strain vector (e.g., any of 313a-n), a joint vector (e.g., any of 314a-n), a mask vector (e.g., any of 315a-n), a scan mask vector (e.g., any of 316a-n), captured at a respective time instant during the data bundle time period [0, Tb]. For example, the muscle vectors 312a may further include a cache of eye muscle movement vectors, including point of focus, and/or the like. For another example, the joint vectors 314a may further include a cache of jaw movement vectors, and/or the like.

Thus, a data bundle 211 is generated by packaging several scans over the data bundle time period into a cache of the skin surface vectors 311a-n, muscle vectors 312a-n, strain vectors 313a-n, joint vectors 314a-n, mask vectors 315a-n, scan mask vectors 316a-n, and/or the like. For example, a training dataset for a specific human actor may be generated from 5000-7000 frames of scans of facial movement. For another example, a portion of the training data, e.g., 5%, may be synthetic data generated from a puppet. The facial movement may include one or more of a facial action, a dialog, and/or a depiction of an emotion. The training frames of facial scans may include 60% action frames, 25% of facial scans when the actor is articulating a dialogue, 10% emotional expression frames, 5% shot-based scans (e.g., with neutral faces). The data bundle 211 may further include a static anatomical data vector 317.

The packaging of caches of scans 305a-n may be repeated for multiple data bundle time periods to generate a sequence of data bundles as training data for the machine learning model.

In one embodiment, the data bundle 211 may be optionally generated from facial scans taken from different days. For example, the facial condition of the actor may vary (even slightly), e.g., morning swellness, droopiness due to tiredness, etc., resulting in different skins, even with the same muscle strain vectors, or vice versa. Thus, the facial scans may be taken from the live actor, e.g., at the same time of the day across multiple days for the live actor to have a "smile" expression, and the facial scans may be averaged out across the multiple days for a fair representation of facial scan data.

For example, to generate a training dataset of data bundles, the facial scans 305a-n may start with a facial scan of the live actor at a neutral pose or facial action, e.g., facial scan 305a may correspond to a scan of neural or rested facial action. Facial scan 305b may include different facial movement, pose or expression, such as "smile," "grin," "frown," etc. The facial scans may then end at the neutral pose, e.g., the facial scan 305n may again show a neural facial action. In this way, the series of facial scans 305a-n may capture a series of evolution of muscle/joint movements across different facial actions in both directions.

Figure 4A:
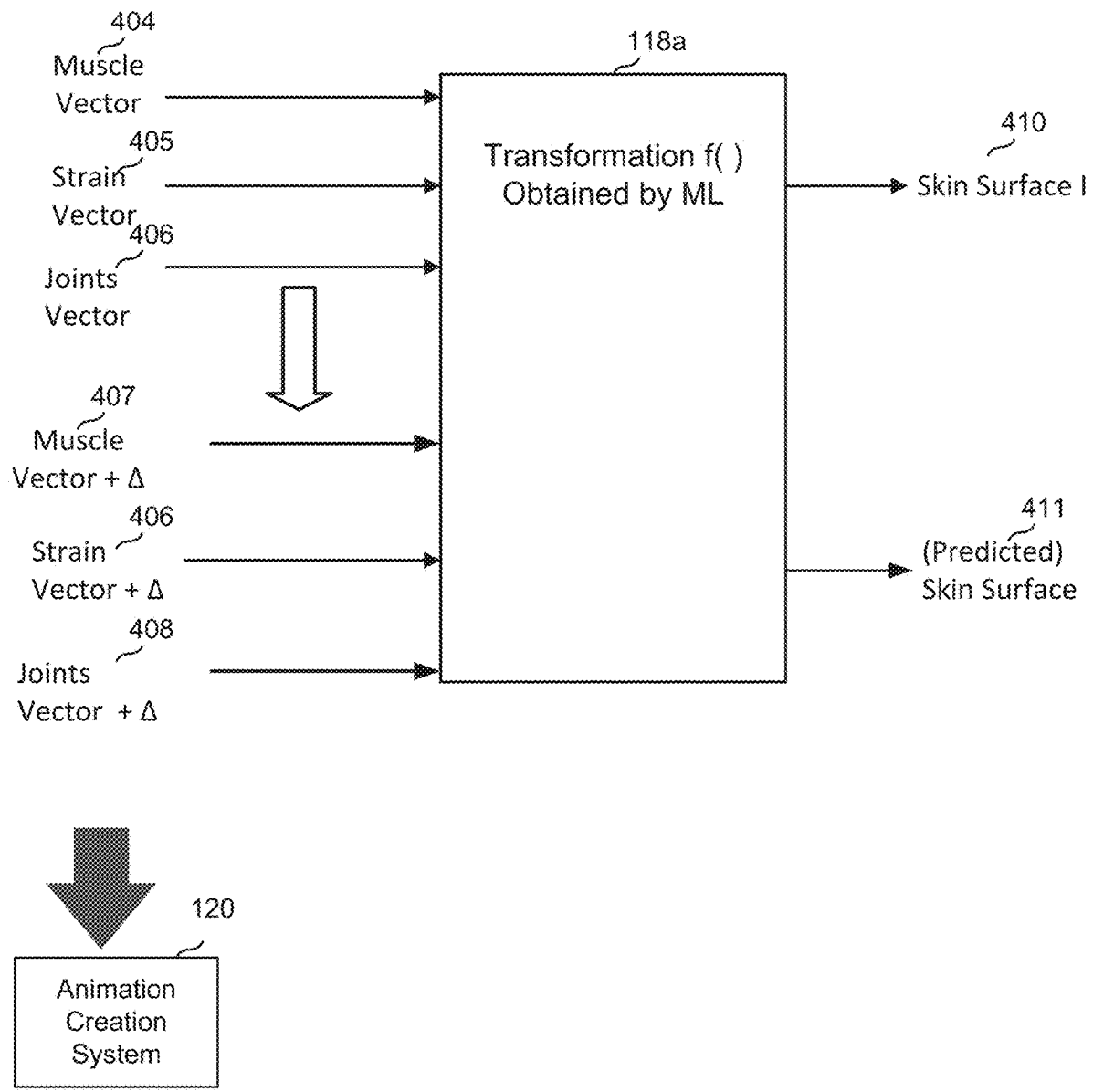
FIGS. 4A-4B illustrate an aspect of a transformation function between muscle and joint vectors and the skin surface representation configured by the machine learning model described in FIG. 1, according to embodiments described herein.

FIG. 4A illustrates an aspect of transforming muscle and joint vectors to the skin surface representation at an inference stage of the machine learning model 118a described in FIG. 2A, according to embodiments described herein. The transformation model f( ) may be established by training the machine learning model 118a shown in FIG. 2A, which transforms the muscle vectors 404, strain vector 405, joint vectors 406, and/or other vectors into the skin surface vector 410, given known anatomical data corresponding to a specific human actor, e.g., as in Equation 2.

skin surface vector=f(muscle vector,joint vector,
    strain vector, . . . ,anatomical data)  (Eqn. 2)

When the anatomical data is static for a specific human actor, the muscle vectors, strain vectors, joint vectors, and/or other vectors (such as mask vectors, scan mask vectors, etc.) are variables that determine the output skin surface vector 410.

Thus, the transformation f( ) may be used to predict a resulting skin surface given the configured muscle vectors, strain vectors and joint vectors. For example, as described in FIG. 2A, during the training stage of machine learning model 118a, a data bundle comprising caches of muscle vectors 404, strain vectors 405, joints vectors 406 and skin surface ground truth (e.g., representing a "gentle smile") may be used to train the machine learning 118a to obtain the transformation f( ) by minimizing the loss between the predicted skin surface representation 410 and the ground truth skin surface. After establishing f( ) during the inference stage of machine learning model 118a, an animator such as an artist, a programmer, and/or the like, may adjust the values of the muscle vector 404, strain vector 405, and the joint vector 406, e.g., to muscle vector+Δ 407, strain vector+Δ 406, joints vector+Δ 408, where Δ represents an adjusted amount of the respective vector.

In some implementations, the ground truth skin 242 may be optionally obtained from facial scans that are averaged out across multiple days, e.g., the same live actor performing "gentle smile" at the same time of different days. In this way, the averaged ground truth skin 242 may more fairly represent the "truth" of the live actor, overcoming the slight daily variation due to swellness, tiredness, and/or the like.

The strain vector+Δ 406, muscle vector+Δ 407, joints vector+Δ 408 may then be used to generate a modified data bundle. For example, a modified data bundle may be generated, which comprises a cache of the strain vector+Δ 406, muscle vector+Δ 407, joints vector+Δ 408, etc. over the data bundle time period. The modified data bundle may then be sent to the machine learning model 118a, which may in turn generate a predicted skin surface 411.

For example, if skin surface 410 represents a facial action that belongs to the expression "smile," the animator or the artist may modify the known muscle vector 404 and joints vector 406 that result in the expression "smile" to generate a different facial action. For instance, the animator may modify the strains of certain muscles to a greater value, indicating a stronger muscle movement, and/or modify an opening angle of the joints vector to a greater value, indicating a wider opening of the jaw joint such that more teeth can be exposed, and/or the like. The resulting modified strain vector+Δ 406, muscle vector+Δ 407, joints vector+Δ 408 may be input to the machine learning model 118a to generate the predicted skin surface 411, which may look like a facial action that belongs to the expression "grin." In this way, the animator or the artist may constantly adjust the modification to the muscle or joint vectors until a satisfactory skin surface of "grin" is achieved.

The cache of the strain vector+Δ 406, muscle vector+Δ 407, joints vector+Δ 408 may then be sent to the animation creation system 120, e.g., for animating an expression of "grin."

Figure 4B:
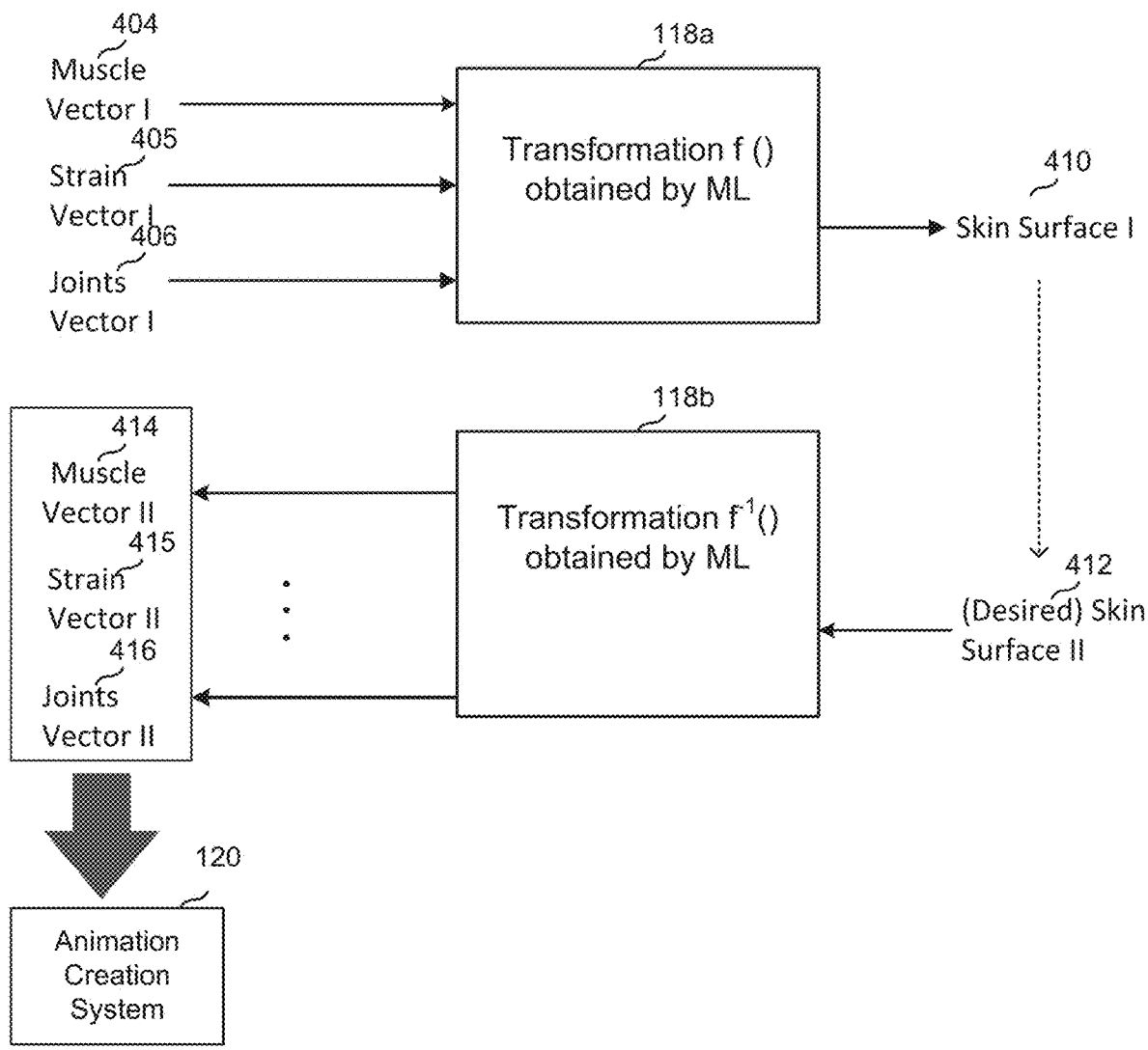

FIG. 4B illustrates an aspect of transforming a skin surface back to the muscle and joint vectors at an inference stage of the machine learning model 118b described in FIG. 2B, according to embodiments described herein. The transformation model f$^1$( ) may be established by training the machine learning model 118b shown in FIG. 2B, which transforms the skin surface, given known anatomical data corresponding to a specific human actor, back to the underlying muscle and/or joints vector, e.g., as in Equation 3.

(muscle vector,strain,joint vector)=f$^1$(skin surface
    vector, . . . ,anatomical data)  (Eqn. 3)

For example, if skin surface 410 represents a facial action that belongs to the expression "smile," the animator or the artist may want to generate a desired skin surface 412, e.g. "grin." The trained transformation f$^1$ ( ) from machine learning model 118b may be applied to reversely derive the corresponding muscle vectors 414, strain vector 415, joints vectors 416 and/or the like that result in the desired skin surface 412 "grin."

Thus, a new data bundle may be generated, which comprises a cache of the derived muscle vectors 414, strain vector 415, joints vectors 416, etc. over the data bundle time period. The derived muscle vectors 414, strain vector 415, joints vectors 416, etc. may be applied to a muscle simulator model 110, causing the muscle model to move in variance with the modified data bundle over the data bundle time period. The new data bundle comprising the cache of the derived muscle vectors 414, strain vector 415, joints vectors 416, etc. approximates a data bundle that is obtained according to the artist movement adjustment from "gentle smile" to "grin," e.g., as if the data bundle is directly obtained directly from facial scans of the live actor when the live actor performs the skin surface "grin."

Therefore, the new data bundle of muscle vectors 414, strain vector 415, joints vectors 416, etc. may be output to the animation creation system 120 to animate the desired skin surface of "grin."

In one embodiment, the animator or the artist may engage a combination of the machine learning models 118a-b to obtain muscle and/or joint vectors/parameters to achieve a desired skin surface. For example, the animator may use the machine learning model 118b at inference stage in FIG. 4B to derive corresponding muscle and/or joint vectors that may supposedly achieve a desired skin surface. The animator may also use machine learning model 118a at inference stage in FIG. 4A to verify whether the desired skin surface can actually be achieved, using the derived muscle and/or joint vectors as input to the machine learning model 118a. The animator may constantly adjust the input muscle and/or joint vectors while observing the resulting skin surface outputted from the machine learning model 118a until the skin surface reaches a desired expression.

In this way, data bundles corresponding to adjusted and/or desired skin surfaces may be derived without time or resource spent employing the live actor to perform additional skin surface. The generated data bundle comprising the cache of muscle vectors 414, strain vector 415, joints vectors 416 and/or the like over the data bundle time period may be provided to the animation creation system 120 to generate the desired skin surface that forms the expression "grin."

Therefore, the transformation f( ) and its inverse f⁻¹( ) established by the machine learning model 118a-b may be used to configure muscle vectors, joint vectors, and/or other parameters to generate or simulate skin surfaces even without exact skin scans of a live human actor performing the desired facial expression. Efficiency of animation creation can be largely improved, and a wide variety of facial expressions may be simulated by the animation creation system.

As for inputs and outputs of an animation creation system 120, inputs might include an input strain vector, indicative a strain values for some or all of the muscles in the muscle model, and values for the other animation variables, such as a scalar value for a jaw angle, two 2D vectors corresponding to rotations of the eyes, etc. Along with the muscle model, which describes where the muscles are attached and their volume, and a skull model representing an actor's skull shape and contour, and a control vector for other non-muscle animation variables, the animation creation system 402 can determine the volumes occupied by the muscles, and thus the surface of the character's skin, and output a mesh manifold of the character's skin, possibly depicting an expression corresponding to the input strain vector 404.

Using the above methods and apparatus, an animator can specify a facial action in the domain of muscle semantics, which can simplify an animation process compared to limiting the animator to making combinations of recorded expressions as blends of the scanned facial shapes. In the general case, a length of a muscle is determined from its strain value and its rest length. Allowed strain values might be constrained by the manifold so that strain values remain within plausible boundaries. For a given scan of an expression on an actor's face, a muscle model for that live actor, and a skull model for that live actor, an AI process can determine a likely strain vector that, when input to an animation generation system, would result in an expression largely matching the scanned expression. Knowing the strain values, the animation generation system can provide those as the domain in which the animator would modify expressions. After training an AI system using dynamic scans of an actor's face as the ground truth for training, the muscle model can be derived that would allow for the simulation of other expressions that were not captured.

In some instances, there might be more than one hundred muscles represented in the muscle model and the AI system that extracts a strain vector and a control vector from dynamic scans of the actor might be able to provide approximate solutions to match expressions. The control vector might include other values besides jaw and eye positions.

As explained herein, an animation process might simulate facial actions through the use of a unique combination of hi-resolution scans of a human face, simulated muscles, facial control vectors, and constraints to generate unlimited facial actions. In one embodiment, an AI system is employed to receive facial control vectors generated from a series of muscle strain inputs and process those vectors relative to a facial action manifold configured to constrain facial actions of the simulation to plausible expressions. Simulation need not be limited to simulating facial actions that correspond to a real-world physical action, but more generally might be the generation of facial actions informed by expressions made and recorded.

Separate AI systems might be used to train and derive the muscle model and to train and derive the manifold. In some embodiments, in order to hit a target expression (and corresponding skin shape), the muscle model might be differentiable. An AI system might include a variational autoencoder (VAE).

The AI uses muscle control vectors, instead of blend shape weights or other approaches, and can then specify strains on those muscle control vectors, which would in turn specify lengths of contractions of the muscles in a simulator. Each muscle scan be represented by a curve, which might have a length that is a function of the strain. A muscle vector might comprise strains that affect a mesh representing the skin of a character. The muscles might include a rest length and attachment point, and together represent a muscle geometry. Using the combination of the input scans, the strains, the muscle control vectors, and manifold constraints, an animation system can output plausible facial actions.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 5:
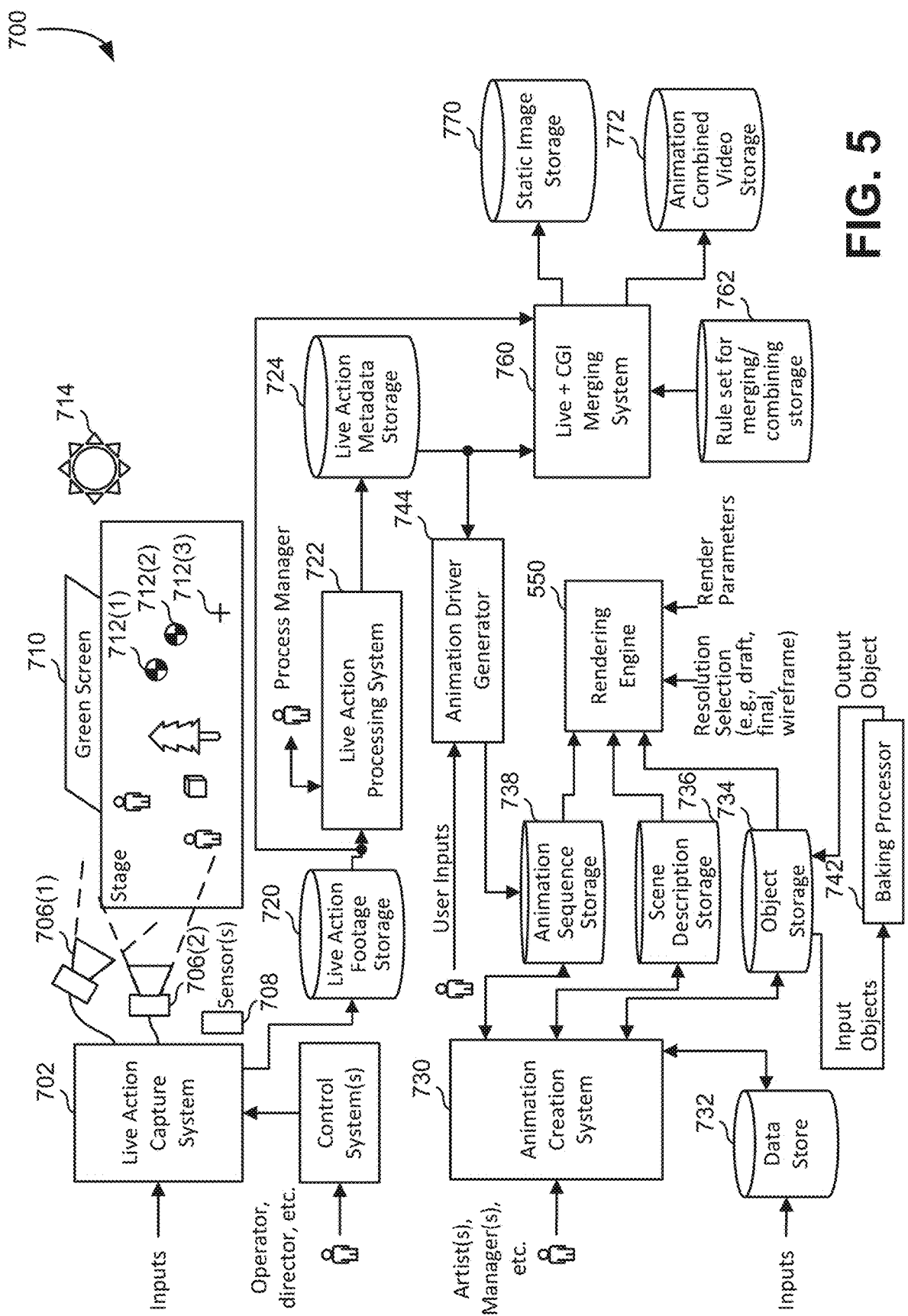
FIG. 5 is a block diagram illustrating an example computer system upon which computer systems of the systems illustrated in FIGS. 1 and 6 may be implemented.

For example, FIG. 5 is a block diagram that illustrates a computer system 500 upon which the computer systems of the system 100 (see FIG. 1) and/or the visual content generation system 600 (see FIG. 6) may be implemented. The computer system 500 includes a bus 502 or other communication mechanism for communicating information, and a processor 504 coupled with the bus 502 for processing information. The processor 504 may be, for example, a general-purpose microprocessor.

The computer system 500 also includes a main memory 506, such as a random-access memory (RAM) or other dynamic storage device, coupled to the bus 502 for storing information and instructions to be executed by the processor 504. The main memory 506 may also be used for storing temporary variables or other intermediate information during execution of instructions to be executed by the processor 504. Such instructions, when stored in non-transitory storage media accessible to the processor 504, render the computer system 500 into a special-purpose machine that is customized to perform the operations specified in the instructions.

The computer system 500 further includes a read only memory (ROM) 508 or other static storage device coupled to the bus 502 for storing static information and instructions for the processor 504. A storage device 510, such as a magnetic disk or optical disk, is provided and coupled to the bus 502 for storing information and instructions.

The computer system 500 may be coupled via the bus 502 to a display 512, such as a computer monitor, for displaying information to a computer user. An input device 514, including alphanumeric and other keys, is coupled to the bus 502 for communicating information and command selections to the processor 504. Another type of user input device is a cursor control 516, such as a mouse, a trackball, or cursor direction keys for communicating direction information and command selections to the processor 504 and for controlling cursor movement on the display 512. This input device typically has two degrees of freedom in two axes, a first axis (e.g., x) and a second axis (e.g., y), that allows the device to specify positions in a plane.

The computer system 500 may implement the techniques described herein using customized hard-wired logic, one or more ASICs or FPGAs, firmware and/or program logic which in combination with the computer system causes or programs the computer system 500 to be a special-purpose machine. According to one embodiment, the techniques herein are performed by the computer system 500 in response to the processor 504 executing one or more sequences of one or more instructions contained in the main memory 506. Such instructions may be read into the main memory 506 from another storage medium, such as the storage device 510. Execution of the sequences of instructions contained in the main memory 506 causes the processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 510. Volatile media includes dynamic memory, such as the main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 502. Transmission media can also take the form of acoustic or light waves, such as those generated during radio-wave and infra-red data communications.

Various forms of media may be involved in carrying one or more sequences of one or more instructions to the processor 504 for execution. For example, the instructions may initially be carried on a magnetic disk or solid state drive of a remote computer. The remote computer can load the instructions into its dynamic memory and send the instructions over a network connection. A modem or network interface local to the computer system 500 can receive the data. The bus 502 carries the data to the main memory 506, from which the processor 504 retrieves and executes the instructions. The instructions received by the main memory 506 may optionally be stored on the storage device 510 either before or after execution by the processor 504.

The computer system 500 also includes a communication interface 518 coupled to the bus 502. The communication interface 518 provides a two-way data communication coupling to a network link 520 that is connected to a local network 522. For example, the communication interface 518 may be an integrated services digital network (ISDN) card, cable modem, satellite modem, or a modem to provide a data communication connection to a corresponding type of telephone line. Wireless links may also be implemented. In any such implementation, the communication interface 518 sends and receives electrical, electromagnetic, or optical signals that carry digital data streams representing various types of information.

The network link 520 typically provides data communication through one or more networks to other data devices. For example, the network link 520 may provide a connection through the local network 522 to a host computer 524 or to data equipment operated by an Internet Service Provider (ISP) 526. The ISP 526 in turn provides data communication services through the world wide packet data communication network now commonly referred to as the "Internet" 528. The local network 522 and Internet 528 both use electrical, electromagnetic, or optical signals that carry digital data streams. The signals through the various networks and the signals on the network link 520 and through the communication interface 518, which carry the digital data to and from the computer system 500, are example forms of transmission media.

The computer system 500 can send messages and receive data, including program code, through the network(s), the network link 520, and communication interface 518. In the Internet example, a server 530 might transmit a requested code for an application program through the Internet 528, ISP 526, local network 522, and communication interface 518. The received code may be executed by the processor 504 as it is received, and/or stored in the storage device 510, or other non-volatile storage for later execution.

Figure 6:
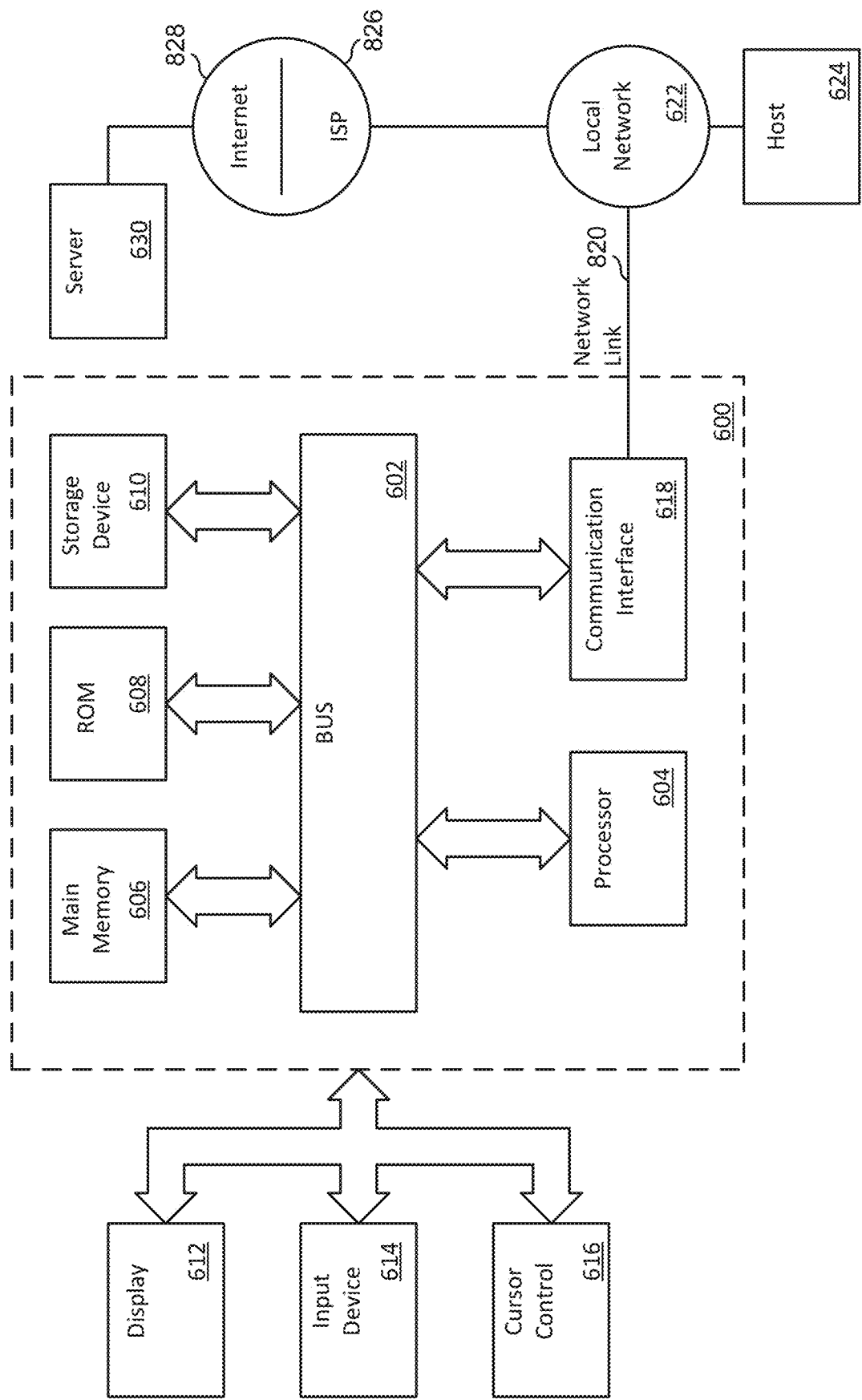
FIG. 6 illustrates an example visual content generation system as might be used to generate imagery in the form of still images and/or video sequences of images.

For example, FIG. 6 illustrates the example visual content generation system 600 as might be used to generate imagery in the form of still images and/or video sequences of images. The visual content generation system 600 might generate imagery of live action scenes, computer-generated scenes, or a combination thereof. In a practical system, users are provided with tools that allow them to specify, at high levels and low levels where necessary, what is to go into that imagery. For example, a user might be an animation artist and might use the visual content generation system 600 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 600 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50

FPS, 140 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. Taking all of that as inputs, a rendering engine may compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 6, a live action capture system 602 captures a live scene that plays out on a stage 604. The live action capture system 602 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 606(1) and 606(2) capture the scene, while in some systems, there might be other sensor(s) 608 that capture information from the live scene (e.g., infrared cameras, infrared sensors, motion capture ("mo-cap") detectors, etc.). On the stage 604, there might be human actors, animal actors, inanimate objects, background objects, and possibly an object such as a green screen 610 that is designed to be captured in a live scene recording in such a way that it is easily overlaid with computer-generated imagery. The stage 604 might also contain objects that serve as fiducials, such as fiducials 612(1)-(3), that might be used post-capture to determine where an object was during capture. A live action scene might be illuminated by one or more lights, such as an overhead light 614.

During or following the capture of a live action scene, the live action capture system 602 might output live action footage to a live action footage storage 620. A live action processing system 622 might process live action footage to generate data about that live action footage and store that data into a live action metadata storage 624. The live action processing system 622 might include computer processing capabilities, image processing capabilities, one or more processors, program code storage for storing program instructions executable by the one or more processors, as well as user input devices and user output devices, not all of which are shown. The live action processing system 622 might process live action footage to determine boundaries of objects in a frame or multiple frames, determine locations of objects in a live action scene, where a camera was relative to some action, distances between moving objects and fiducials, etc. Where elements are sensed or detected, the metadata might include location, color, and intensity of the overhead light 614, as that might be useful in post-processing to match computer-generated lighting on objects that are computer-generated and overlaid on the live action footage. The live action processing system 622 might operate autonomously, perhaps based on predetermined program instructions, to generate and output the live action metadata upon receiving and inputting the live action footage. The live action footage can be camera-captured data as well as data from other sensors.

An animation creation system 630 is another part of the visual content generation system 600. The animation creation system 630 might include computer processing capabilities, image processing capabilities, one or more processors, program code storage for storing program instructions executable by the one or more processors, as well as user input devices and user output devices, not all of which are shown. The animation creation system 630 might be used by animation artists, managers, and others to specify details, perhaps programmatically and/or interactively, of imagery to be generated. From user input and data from a database or other data source, indicated as a data store 632, the animation creation system 630 might generate and output data representing objects (e.g., a horse, a human, a ball, a teapot, a cloud, a light source, a texture, etc.) to an object storage 634, generate and output data representing a scene into a scene description storage 636, and/or generate and output data representing animation sequences to an animation sequence storage 638.

Scene data might indicate locations of objects and other visual elements, values of their parameters, lighting, camera location, camera view plane, and other details that a rendering engine 650 might use to render CGI imagery. For example, scene data might include the locations of several articulated characters, background objects, lighting, etc.

specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 630 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 634 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 632 might be used to drive object presentation. For example, if an artist is creating an animation of a spaceship passing over the surface of the Earth, instead of manually drawing or specifying a coastline, the artist might specify that the animation creation system 630 is to read data from the data store 632 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 644 might read in live action metadata, such as data representing movements and positions of body parts of a live actor during a live action scene, and generate corresponding animation parameters to be stored in the animation sequence storage 638 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 622. The animation driver generator 644 might convert that movement data into specifications of how joints of an articulated CGI character are to move over time.

A rendering engine 650 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important than speed for a movie maker to generate data that will be used for final prints of feature films to be distributed. The rendering engine 650 might include computer processing capabilities, image processing capabilities, one or more processors, program code storage for storing program instructions executable by the one or more processors, as well as user input devices and user output devices, not all of which are shown.

The visual content generation system 600 can also include a merging system 660 that merges live footage with animated content. The live footage might be obtained and input by reading from the live action footage storage 620 to obtain live action footage, by reading from the live action metadata storage 624 to obtain details such as presumed segmentation in captured images segmenting objects in a live action scene from their background (perhaps aided by the fact that the green screen 610 was part of the live action scene), and by obtaining CGI imagery from the rendering engine 650.

A merging system 660 might also read data from rulesets for merging/combining storage 662. A very simple example of a rule in a ruleset might be "obtain a full image including a two-dimensional pixel array from live footage, obtain a full image including a two-dimensional pixel array from the rendering engine 650, and output an image where each pixel is a corresponding pixel from the rendering engine 650 when the corresponding pixel in the live footage is a specific color of green, otherwise output a pixel color value from the corresponding pixel in the live footage."

The merging system 660 might include computer processing capabilities, image processing capabilities, one or more processors, program code storage for storing program instructions executable by the one or more processors, as well as user input devices and user output devices, not all of which are shown. The merging system 660 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 660, such as modifying boundaries of segmented objects, inserting blurs to smooth out imperfections, or adding other effects. Based on its inputs, the merging system 660 can output an image to be stored in a static image storage 670 and/or a sequence of images in the form of video to be stored in an animated/combined video storage 672.

Thus, as described, the visual content generation system 600 can be used to generate video that combines live action with computer-generated animation using various components and tools, some of which are described in more detail herein. While the visual content generation system 600 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium, e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for processing data derived from scans of live actors, the method comprising:
    under control of one or more computer systems configured with executable instructions:
        obtaining scan data from a live actor performing a facial movement over a data bundle time period;
        deriving a data bundle from the scan data, wherein the data bundle comprises control values for a muscle model of the live actor for application to the muscle model and rendering as an animation, to approximate the performance, the data bundle comprising a first cache of time-varying topology data representing movement of a skin surface over the data bundle time period and a second cache of time-varying vector data representing changes to muscle strains in a muscle strain vector over the data bundle time period;
        obtaining an artist movement adjustment for the skin surface relative to movement corresponding to the data bundle; and
        generating a modified data bundle having a modifier first cache comprising the artist movement adjustment and a modified second cache generated by inputting the modified first cache to a machine learning model that formulates a relationship between an input skin surface and an output muscle strain vector, wherein the modified second cache, when applied to the muscle model, causes the muscle model to move in variance with the data bundle to approximate the modified first cache represented by the first cache adjusted according to the artist movement adjustment.

2. The computer-implemented method of claim 1, wherein the scan data includes a first facial scan capturing a neutral pose of a live actor, and a second facial scan capturing a non-neutral pose of the live actor.

3. The computer-implemented method of claim 1, wherein the data bundle further comprises a third cache of data representing any combination of jaw movements and eye movements over the data bundle time period.

4. The computer-implemented method of claim 3, further comprising:
    determining an action locus for the artist movement adjustment;
    determining a range of action for the artist movement adjustment;
    determining a subset of the muscle strain vector applicable to the range of action; and
    limiting changes of the modified first cache relative to the first cache to changes in the subset of the muscle strain vector.

5. The computer-implemented method of claim 1, further comprising limiting a search for values for the second cache to a manifold of allowed values for the second cache of data.

6. The computer-implemented method of claim 5, wherein the manifold of allowed values for the second cache of data correspond to known feasible expressions of the live actor.

7. The computer-implemented method of claim 1, wherein the facial movement is one or more of a facial action, a dialog, and/or a depiction of an emotion.

8. A computer system for processing data derived from scans of live actors, the system comprising:
one or more processors; and
a memory storing processor-executable instructions executed by the one or more processors to:
obtain scan data from a live actor performing a facial movement over a data bundle time period;
derive a data bundle from the scan data, wherein the data bundle comprises control values for a muscle model of the live actor for application to the muscle model and rendering as an animation, to approximate the performance, the data bundle comprising a first cache of data representing movement of a skin surface over the data bundle time period and a second cache of data representing changes to muscle strains in a muscle strain vector over the data bundle time period;
obtain an artist movement adjustment for the skin surface relative to movement corresponding to the data bundle; and
generate a modified data bundle having a modifier first cache comprising the artist movement adjustment and a modified second cache generated by inputting the modified first cache to a machine learning model that formulates a relationship between an input skin surface and an output muscle strain vector, wherein the modified second cache, when applied to the muscle model, causes the muscle model to move in variance with the data bundle to approximate the modified first cache represented by the first cache adjusted according to the artist movement adjustment.

9. The system of claim 8, wherein the scan data includes a first facial scan capturing a neutral pose of a live actor, and a second facial scan capturing a non-neutral pose of the live actor.

10. The system of claim 8, wherein the data bundle further comprises a third cache of data representing any combination of jaw movements and eye movements over the data bundle time period.

11. The system of claim 10, wherein the one or more processors further execute the processor-executable instructions to:
determine an action locus for the artist movement adjustment;
determining a range of action for the artist movement adjustment;
determining a subset of the muscle strain vector applicable to the range of action; and
limiting changes of the modified first cache relative to the first cache to changes in the subset of the muscle strain vector.

12. The system of claim 8, wherein the one or more processors further execute the processor-executable instructions to:
limit a search for values for the second cache to a manifold of allowed values for the second cache of data.

13. The system of claim 12, wherein the manifold of allowed values for the second cache of data correspond to known feasible expressions of the live actor.

14. The system of claim 8, wherein the facial movement is one or more of a facial action, a dialog, and/or a depiction of an emotion.

15. A computer-readable non-transitory storage medium storing computer-executable instructions for processing data derived from scans of live actors, the computer-executable instructions being executable by one or more processors to perform operations comprising:
obtaining scan data from a live actor performing a facial movement over a data bundle time period;
deriving a data bundle from the scan data, wherein the data bundle comprises control values for a muscle model of the live actor for application to the muscle model and rendering as an animation, to approximate the performance, the data bundle comprising a first cache of data representing movement of a skin surface over the data bundle time period and a second cache of data representing changes to muscle strains in a muscle strain vector over the data bundle time period;
obtaining an artist movement adjustment for the skin surface relative to movement corresponding to the data bundle; and
generating a modified data bundle having a modifier first cache comprising the artist movement adjustment and a modified second cache generated by inputting the modified first cache to a machine learning model that formulates a relationship between an input skin surface and an output muscle strain vector, wherein the modified second cache, when applied to the muscle model, causes the muscle model to move in variance with the data bundle to approximate the modified first cache represented by the first cache adjusted according to the artist movement adjustment.

16. The medium of claim 15, wherein the scan data includes a first facial scan capturing a neutral pose of a live actor, and a second facial scan capturing a non-neutral pose of the live actor.

17. The medium of claim 15, wherein the data bundle further comprises a third cache of data representing any combination of jaw movements and eye movements over the data bundle time period.

18. The medium of claim 17, wherein the operations further comprise:
determining an action locus for the artist movement adjustment;
determining a range of action for the artist movement adjustment;
determining a subset of the muscle strain vector applicable to the range of action; and
limiting changes of the modified first cache relative to the first cache to changes in the subset of the muscle strain vector.

19. The medium of claim 15, wherein the operations further comprise limiting a search for values for the second cache to a manifold of allowed values for the second cache of data.

20. The medium of claim 15, wherein the manifold of allowed values for the second cache of data correspond to known feasible expressions of the live actor.

* * * * *